US012638000B2

(12) United States Patent
Jenkins, IV

(10) Patent No.: US 12,638,000 B2
(45) Date of Patent: May 26, 2026

(54) WATER TURBINE SYSTEM AND METHOD OF USE

(71) Applicant: Robert W Jenkins, IV, Columbia, MO (US)

(72) Inventor: Robert W Jenkins, IV, Columbia, MO (US)

( * ) Notice: Subject to any disclaimer, the term of this patent is extended or adjusted under 35 U.S.C. 154(b) by 0 days.

(21) Appl. No.: 18/928,942

(22) Filed: Oct. 28, 2024

(65) Prior Publication Data

US 2025/0137434 A1 May 1, 2025

Related U.S. Application Data

(60) Provisional application No. 63/546,003, filed on Oct. 27, 2023.

(51) Int. Cl.
*F03B 17/06* (2006.01)

(52) U.S. Cl.
CPC ...... *F03B 17/061* (2013.01); *F05B 2220/706* (2013.01); *F05B 2240/93* (2013.01)

(58) Field of Classification Search
CPC .............. F03B 17/061; F05B 2220/706; F05B 2240/93
See application file for complete search history.

(56) References Cited

U.S. PATENT DOCUMENTS

| | | | | |
|---|---|---|---|---|
| 7,633,178 B1 * | 12/2009 | Embree | F03D 3/068 | 290/55 |
| 8,354,758 B1 * | 1/2013 | Boschma | F03B 17/065 | 290/43 |
| 9,581,127 B2 * | 2/2017 | Van Rompay | F03B 13/10 | |
| 2013/0069369 A1 * | 3/2013 | Salehpoor | F03B 13/264 | 290/55 |
| 2013/0115045 A1 * | 5/2013 | Korac | F03B 17/064 | 415/8 |

* cited by examiner

*Primary Examiner* — Viet P Nguyen
(74) *Attorney, Agent, or Firm* — AVEK IP, LLC

(57) ABSTRACT

A water turbine system for providing electrical power from the flowing of water through a canal element. This invention is ideally suited for placement in a flowing river, but any flowing body of water should provide the necessary kinetic energy for the present invention to function. The turbine could be formed from a modified combine pickup wheel. The system could include a floating barge within the flowing body of water containing an interior channel over which the turbines are affixed.

14 Claims, 8 Drawing Sheets

WATER TURBINE SYSTEM AND METHOD OF USE

CROSS-REFERENCE TO RELATED APPLICATION

This application claims priority in U.S. Provisional Patent Application No. 63/546,003 Filed Oct. 27, 2023, which is incorporated herein by reference.

BACKGROUND OF THE INVENTION

1. Field of the Invention

The present invention relates generally to water turbine system and method for use thereof, and more specifically to a floating canal with turbines for generating electrical power from flowing water.

2. Description of the Related Art

Trying to capture the kinetic energy from moving water to generate usable electricity from a renewable, clean source has been a high priority for many years. Existing systems attempt to harness power from waves or flowing water using buckets, turbines, and other devices. However, these existing systems do not take into consideration the potential damage to the environment, including river beds and river animal life, and have not been able to adequately protect those existing devices from debris and other hazards.

Heretofore there has not been available a system or method for a water turbine system with the advantages and features of the present invention.

BRIEF SUMMARY OF THE INVENTION

The present invention generally provides a water turbine system for providing electrical power from the flowing of water through a canal element. This invention is ideally suited for placement in a flowing river, but any flowing body of water should provide the necessary kinetic energy for the present invention to function.

The turbine could be formed from a modified combine pickup wheel, such as that produced by the J. E. Love Company of Garfield, Washington shown at: https://www.jeloveco.com/parts/M-76,M-76N,M-76W_Pickup_Reel_Operating, Setup,&Parts_Illustrations.pdf, last accessed Oct. 22, 2024, the document linked to which is incorporated herein by reference. Any suitable combine pickup wheel from any manufacturer could be modified to suit the needs of the present invention and to be formed into a water turbine.

The canal element is a three-sided device with a first side, a second side, and a floor. The canal includes one elongated side (e.g. the first side) and one flared out short side (e.g. the second side) to maximize the volume of water flowing through the system and to counteract the water being blocked due to the debris shield. The lack of a top or roof to the canal further maximizes the possible volume flow throughput.

In a preferred embodiment, the first side faces the river bank or shore side to allow debris to skim along the wall like a shield. A debris shield will be located at the entrance to prevent debris from clogging the channel. The debris shield is angled to send the debris along the river-side of the apparatus. Ideally, the first side is parallel with the riverbank. The open end faces upstream.

The canal element may be suspended from flotation devices within a river or other flowing body of water. Work barges could be used as the flotation device. Floating the canal element minimizes pinch points to avoid harming fish or other marine life.

The exiting end of the canal may include a flared opening to allow for exiting water to flow into a void, maximizing velocity of flow through the canal.

Turbines are suspended from the barges, laid across the canal, and are lowered into the flowing water. These turbines capture the kinetic energy from the passing water by turning the turbine which turns generators, thereby creating true base load renewable electricity. This electricity is transferred to shore via power lines from the barges to a shore pole. Covers may be used to protect the equipment from weather.

The generator could be any typical generator for electrical power.

In one embodiment, the turbine includes bats which maintain a straight vertically up-and-down orientation as they enter the water and are pushed back by the water, thereby forcing the bat deeper into the water without lifting against the water.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, “inwardly” and “outwardly” refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Water Turbine System 2

Figure 1:
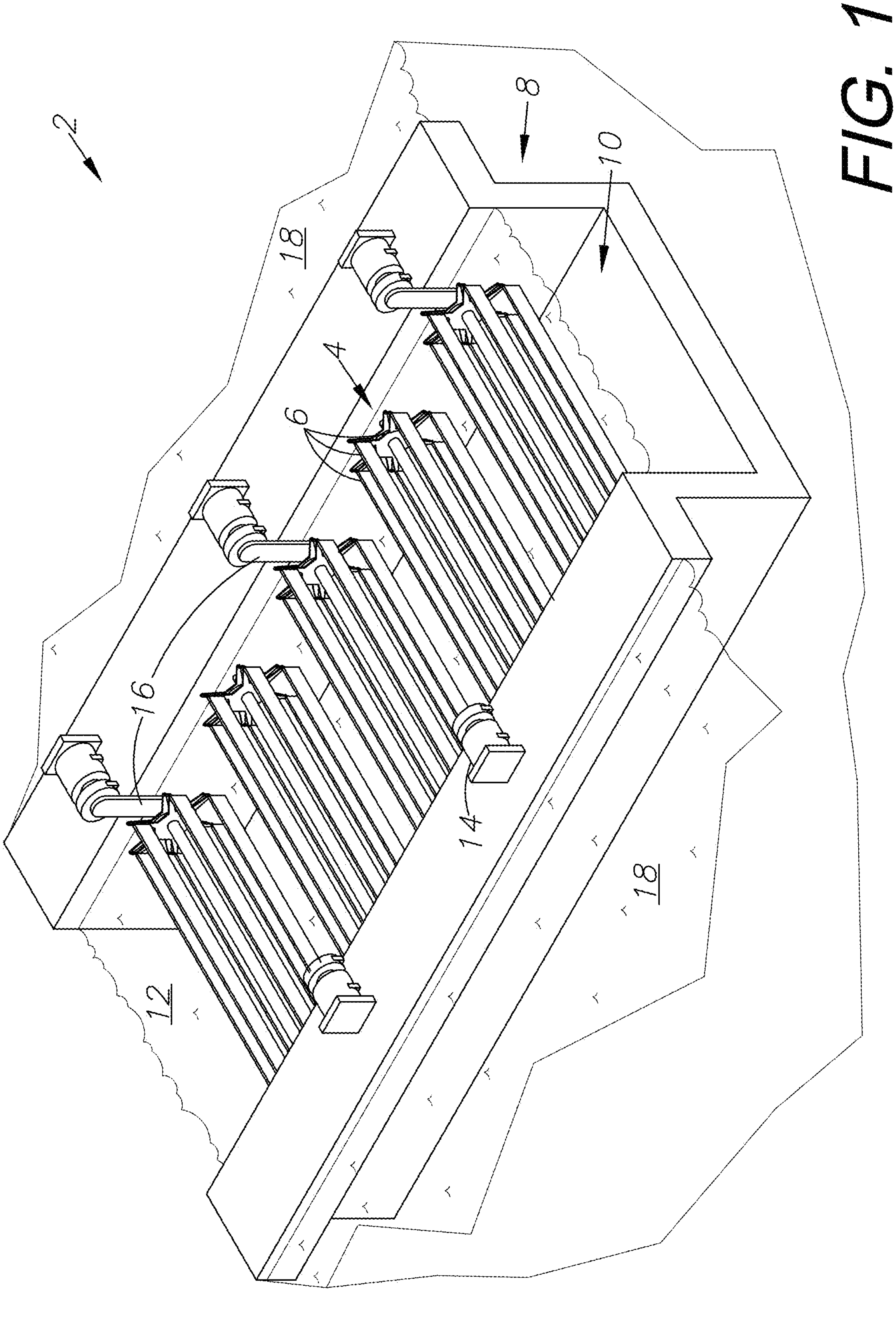
FIG. 1 is a three-dimensional isometric view of a preferred embodiment of the present invention shown in a first, deployed orientation.

As shown in the figures, a prior art combine pickup wheel, such as that produced by the J. E. Love Company of Garfield, Washington shown at:

https://www.jeloveco.com/parts/M-76,M-76N,M-76W_Pickup_Reel_Operating,Setup,&Parts_Illustrations.pdf, last accessed October 22, could be retrofitted to serve as a turbine embodiment for the present invention. FIG. 1 shows a preferred embodiment water turbine system 2, where turbines 4 are laid across a canal system 8 which is kept afloat via floatation barges within a river 16 or other flowing water environment. The turbines 4 could be the above-identified pickup reels, modified existing pickup reels, or proprietary or pre-existing water wheel turbines.

When modifying the pickup reel to serve as a turbine for the present invention, the connected reel elements connected to the reel connectors 30 all become bats 6 and those bats would extend further away to reach the water. The single shaft 26 can also be modified into a bat that exists both above and below the shaft with a connection element to hold the second bat in place. Bracing may be required to support larger bats.

In this modification of the pickup reel, the drive motor of the original product is not needed. Instead, a gear or pully on the end 24 of the center shaft 26 would be used to transfer mechanical energy to a generator connected to the turbine to create power.

Figure 2:
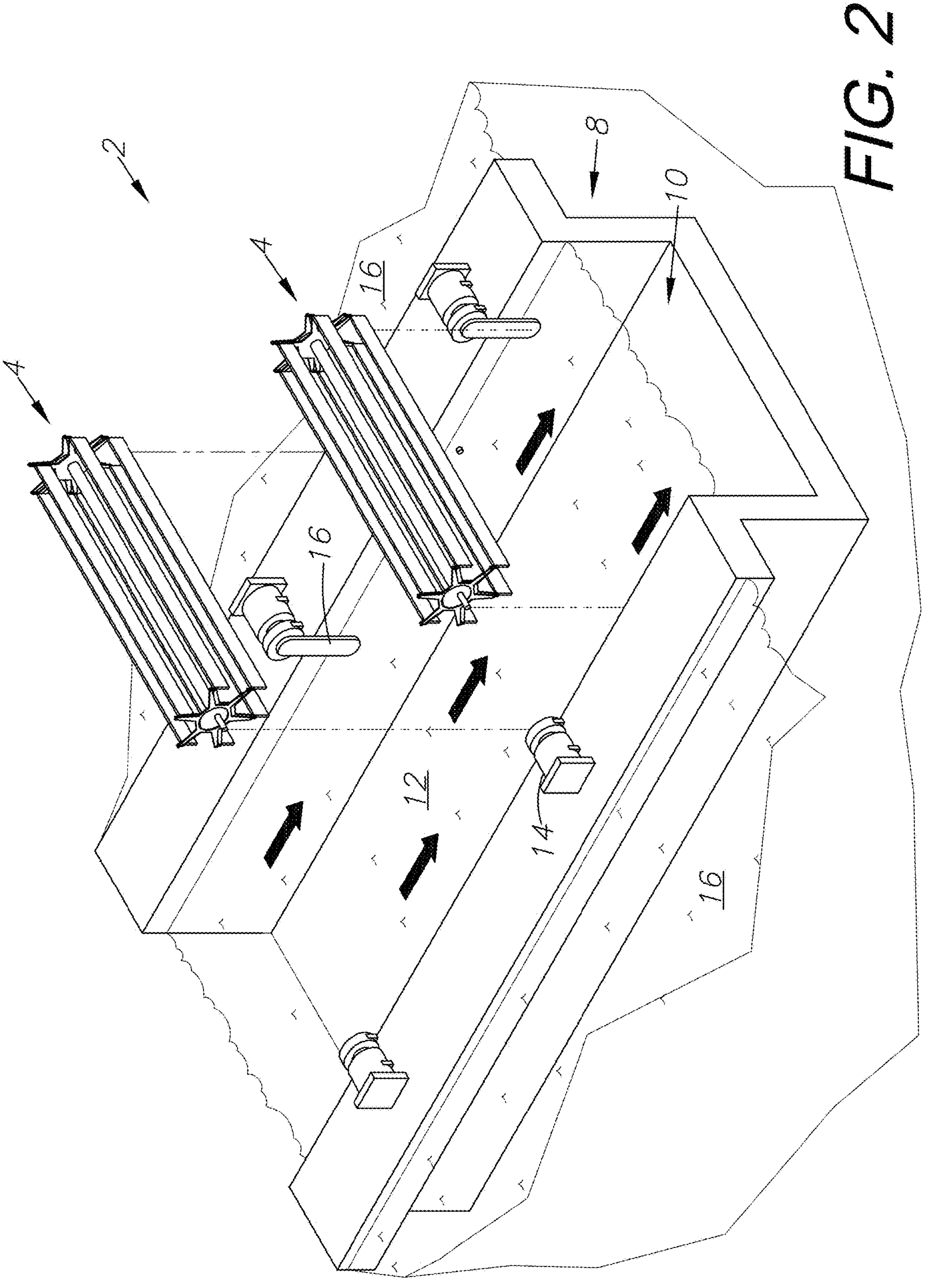
FIG. 2 is a three-dimensional partially-exploded isometric view thereof.

FIG. 2 shows how the turbine 4 is connected to the canal system 8 and the generators 14. The canal system 8 includes a channel 10 which contains the water flow 12 which powers the turbines 4. The canal system 8 could be formed from a working barge which floats away from shore in the flowing water source, and includes a base and a pair of sides 9 to which the generators 14 can be mounted. These turbines 4 would be mechanically connected to generators 14. These generators can then be connected to an electrical pole or other suitable connection on shore. The system 2 could also be designed to be deployed along the edge of a river, in-place canal, or other flowing body of water, or into a constructed, permanent canal with suitable flow.

The canal system 8 could also be constructed from one or more floating elements which form the working barge. The floating elements could be constructed in a way to create an inlet to the channel 10, and may include a flared exit from the channel to help force water out and away from the floating barge elements.

Figure 3:
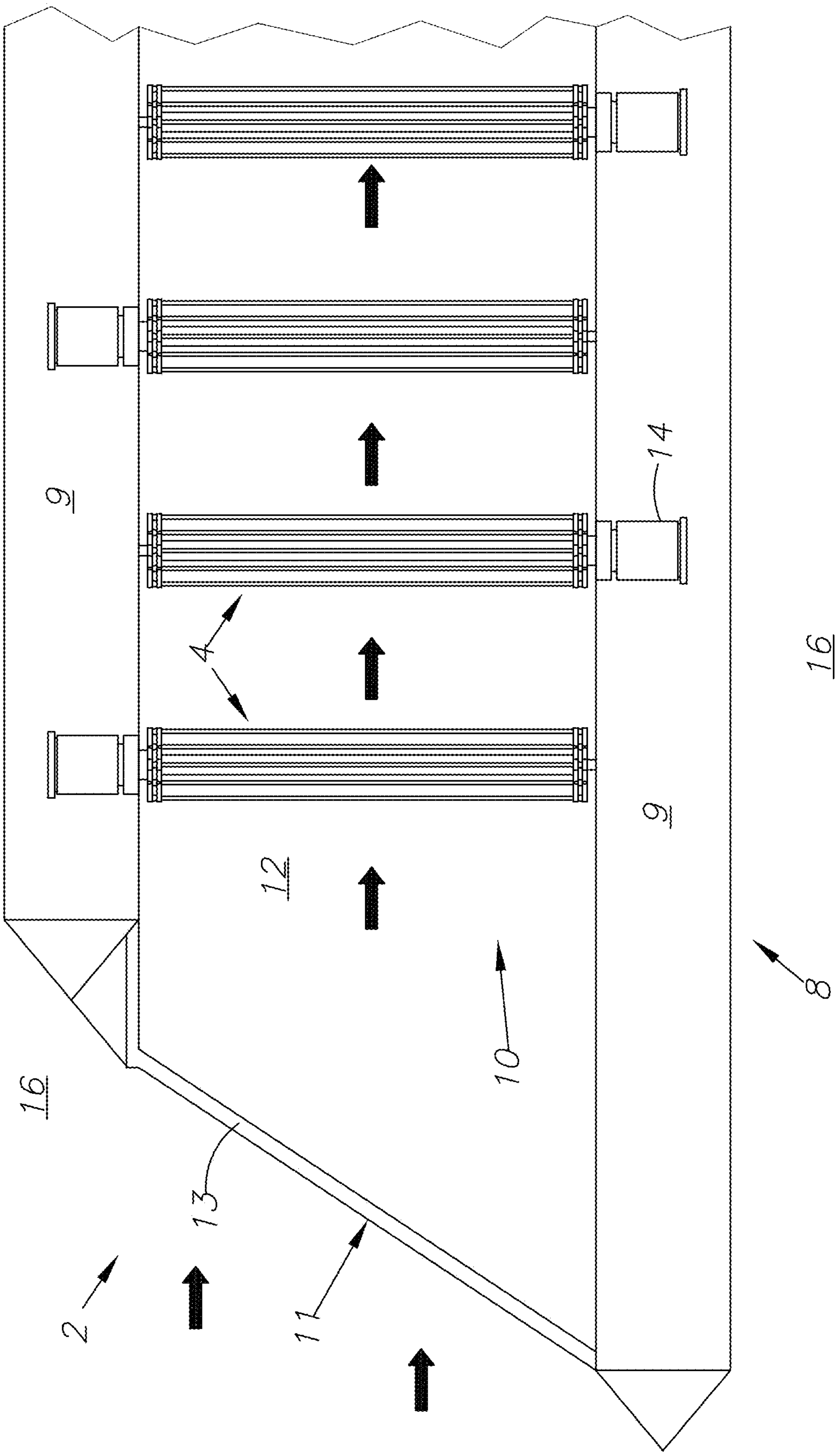
FIG. 3 is a top plan view of the embodiment of FIG. 1.

As shown in FIG. 3, a debris shield 13 is provided at the inlet 11 of the channel 10. This shield could be formed from multiple different mesh or bar sizes, or varying combinations thereof, to protect the system from debris flowing in the water down the canal, the canal flow 12 being the water that passes the turbines 4. This shield can be angled to help deflect debris around the system as well. A V-shaped shield could also be deployed, depending on need. This is very important for running rivers because logs, garbage, and even ice during spring melt could cause issues with the turbines.

Figure 4:
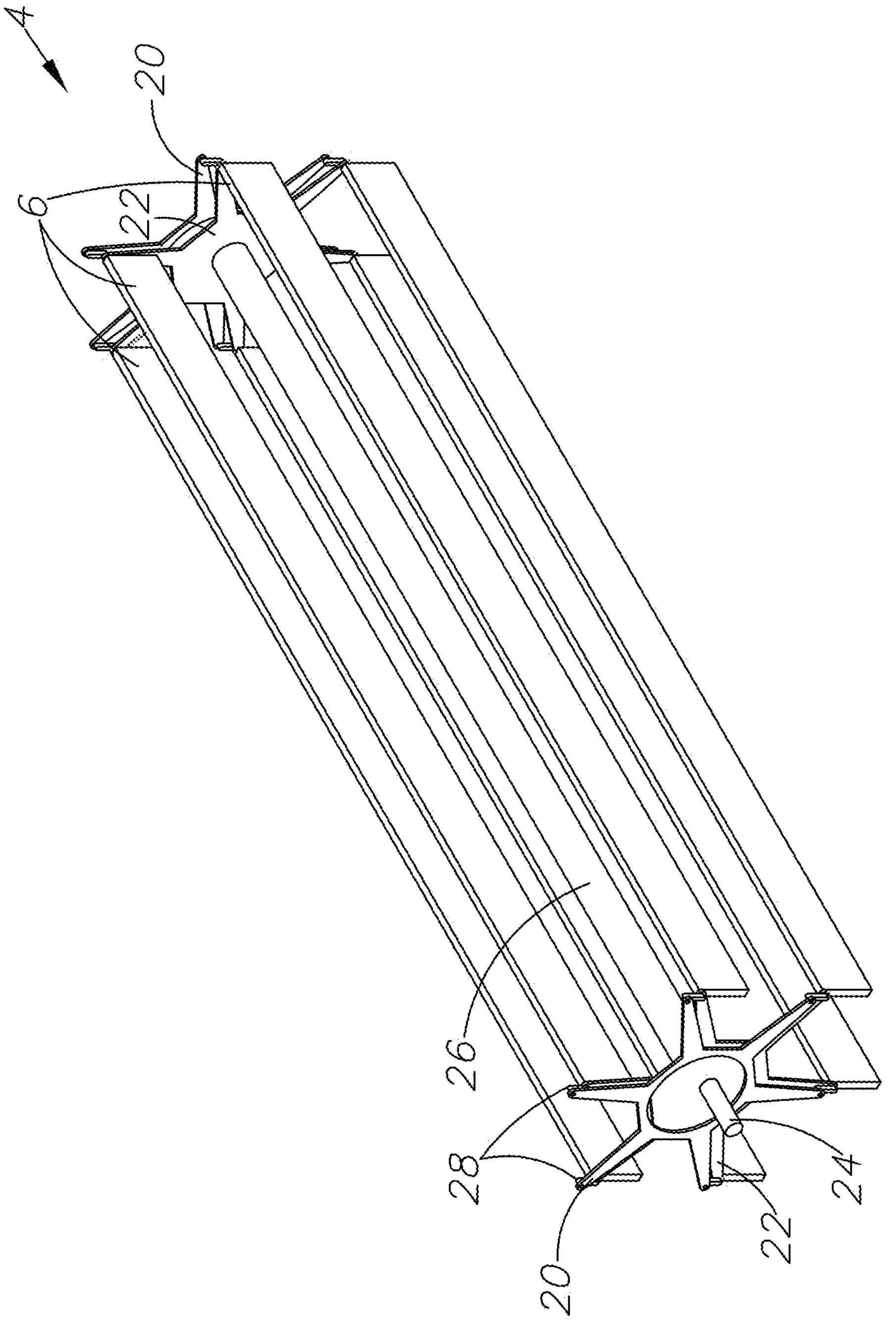
FIG. 4 is a three-dimensional isometric view of a turbine element of the present invention.

FIG. 4 shows the modified pickup wheel as a turbine 4. The turbine as shown 4 includes a pair of outer wheels 20 and inner wheels 22 mounted offset at the ends 24 of the shaft 26. The two wheels 20, 22 are connected via offset connectors 28. The inner wheels 22 are connected to the reel connectors 30 which connect to the bats 6.

Figure 5:
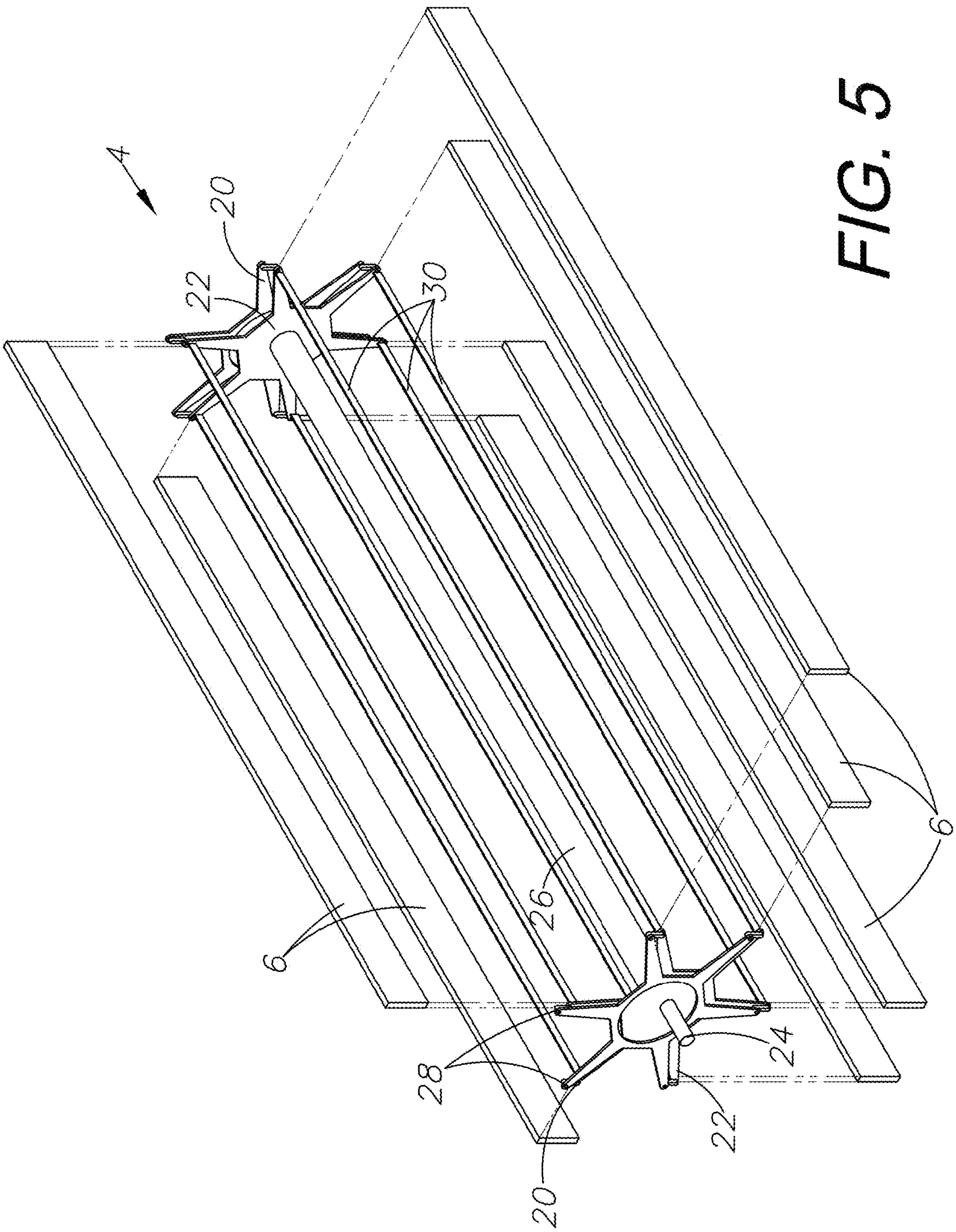
FIG. 5 is a three-dimensional exploded isometric view thereof.
Figure 6:
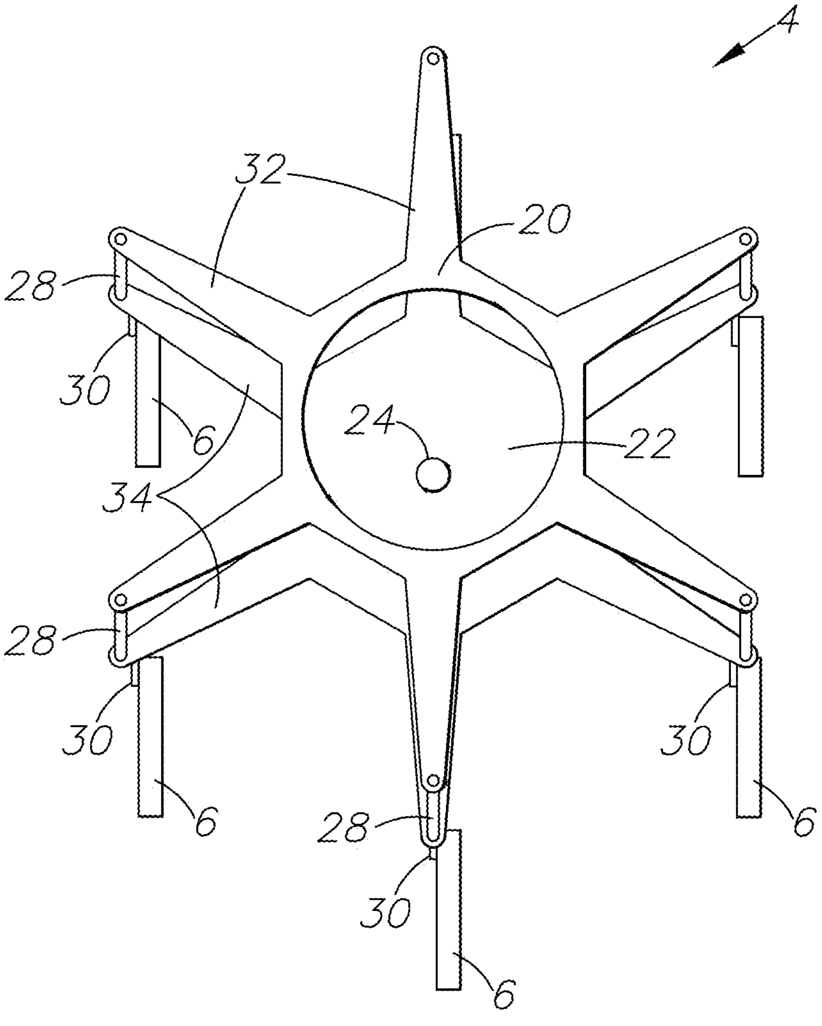
FIG. 6 is a side elevational view of the turbine element of FIG. 4.
Figure 7:
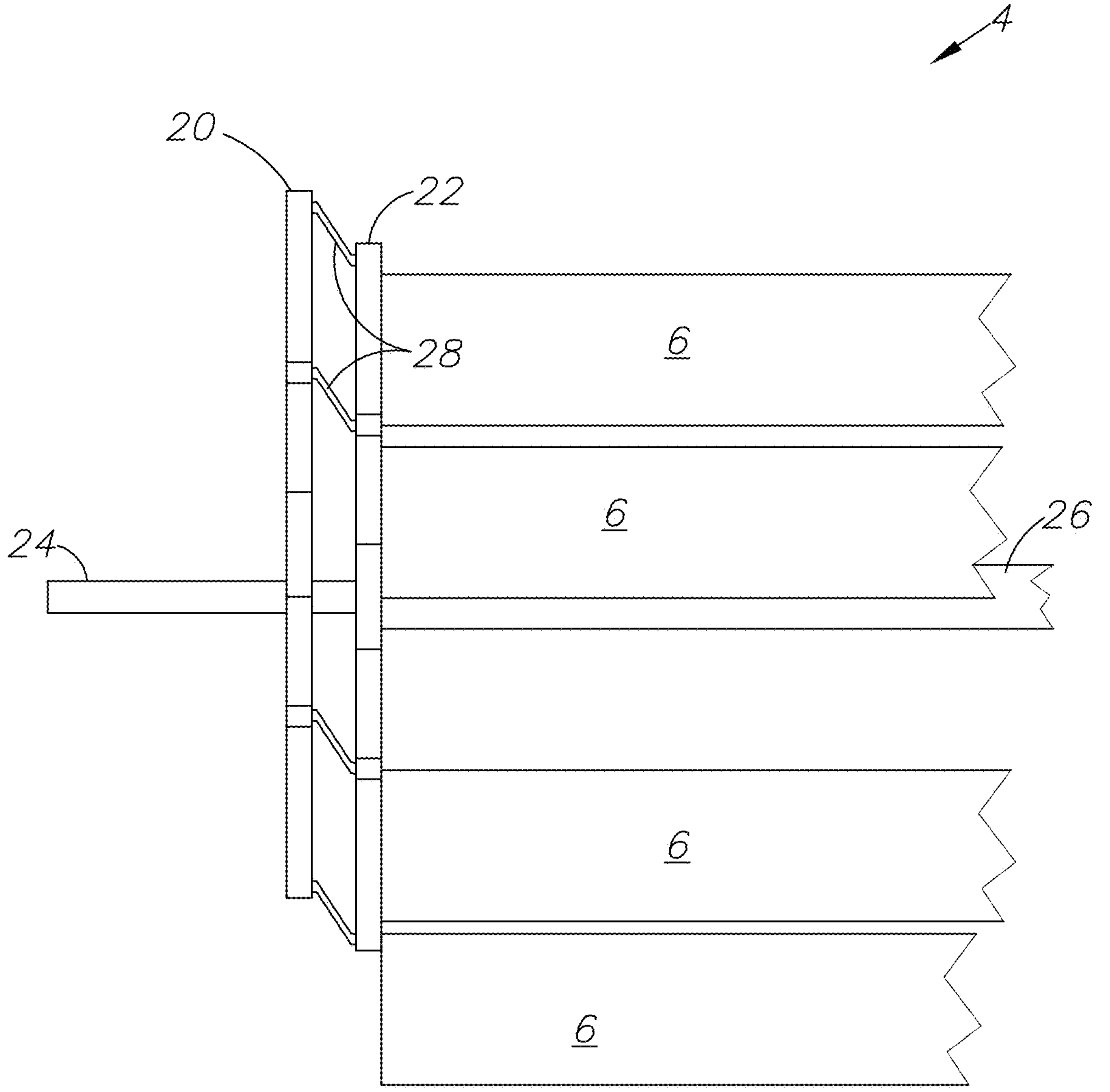
FIG. 7 is a front elevational view thereof.

FIGS. 5-7 show the turbine 4 in additional views. The outer wheel 20 could include a number of spokes 32, and the inner wheel 22 could similarly include a number of spokes 34.

Figure 8:
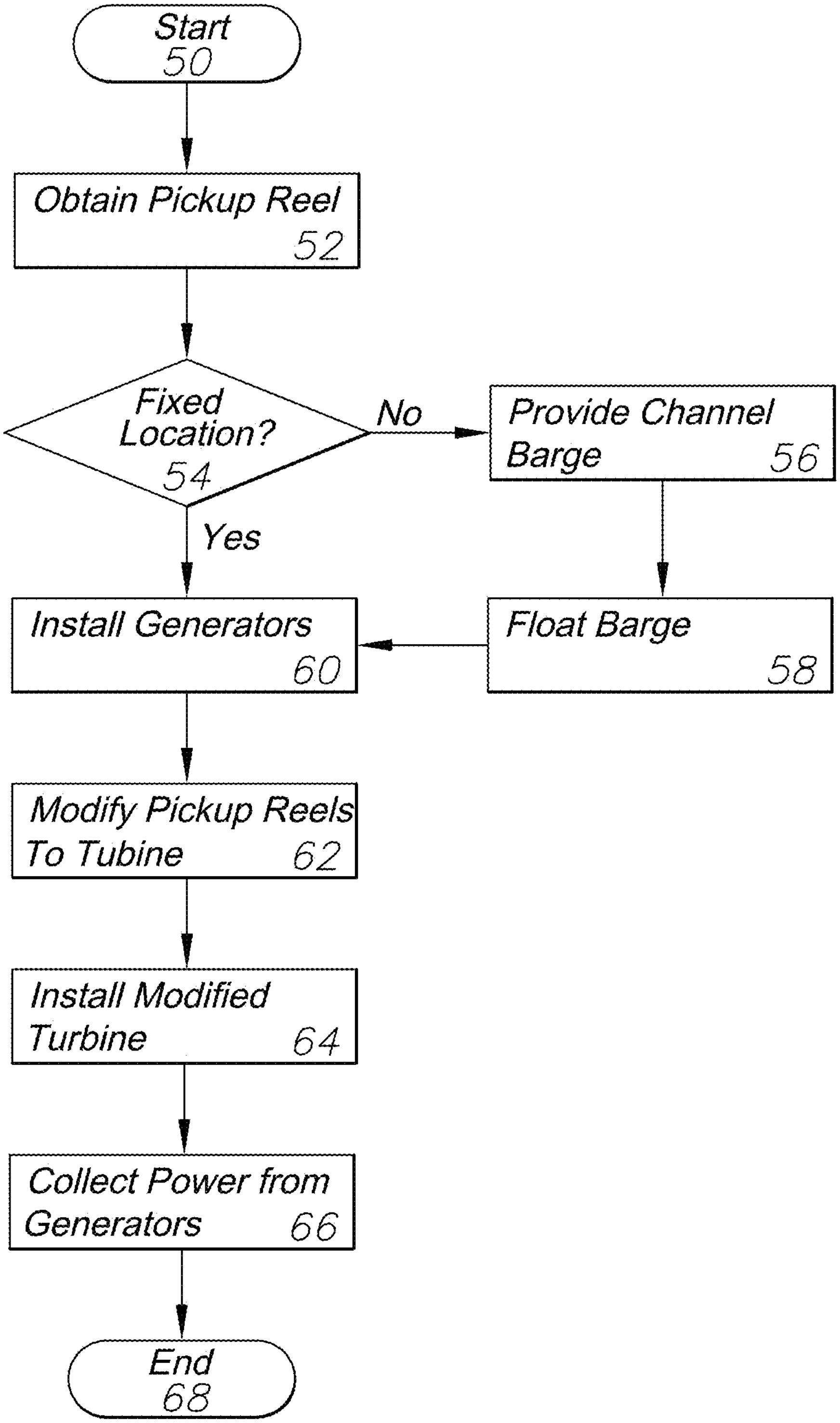
FIG. 8 is a flowchart diagramming the steps taken to practice an embodiment of the present invention.

FIG. 8 is a flowchart diagramming the steps taken in practicing a preferred embodiment of the present invention. The method starts at 50 and a pickup reel is obtained at 52. This could also be replaced with any suitable turbine.

At 54 a determination of placement is made. If the location isn't permanently fixed, a channel barge is provided at 56 and it is floated in the water source at 58.

Generators are installed at the site or on the barge at 60. If the generators obtained at 52 were pickup reels, those pickup reels are modified into the turbines at 62. The turbines are installed at 64. Power is collected from the turbines via generators at 66. The process then ends at 68.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A water turbine system comprising:

a turbine comprised of a pickup reel assembly having a plurality of reel connectors, a central shaft, and a drive motor, wherein the drive motor is removed and bats are affixed to each respective one of said plurality of reel connectors;

a generator affixed to a surface adjacent to a source of flowing water within a channel;

said channel formed from a portion of a flowing water environment;

said turbine extending across said channel, such that said source of flowing water turns said turbine;

said bats configured to contact said source of flowing water, thereby turning said turbine a debris shield located about an intake end of said channel, said debris shield placed at an angle relative to said channel such that said debris shield deflects debris away from said channel and into said flowing water environment, thereby preventing debris from entering said channel;

said central shaft comprising at least one end mechanically connected to said generator such that said turbine transfers mechanical energy to said generator and thereby powers said generator;

said generator connected to an external power grid, whereby said generator delivers power to said external power grid.

2. The water turbine system of claim 1, wherein as one of said bats exits said source of flowing water, a second of said bats simultaneously enters said source of flowing water.

3. The water turbine system of claim 1, further comprising:

at least one bat being affixed to said central shaft; and whereby said at least one bat contacts said source of flowing water, thereby turning said turbine.

4. The water turbine system of claim 3, wherein said at least one bat is maintained at a vertically up-and-down orientation at all times.

5. The water turbine system of claim 1, further comprising:

said generator affixed to a top face of a floating barge assembly;

said floating barge assembly deployed within said source of flowing water; and said floating barge having an interior comprising said channel.

6. The water turbine system of claim 5, further comprising:

said debris shield comprising a V-shape, wherein said V-shape comprises said angle relative to said channel.

7. The system of claim 1, further comprising:

said channel comprising an exit end whereby said source of flowing water exits said channel; and said exit comprising a flared shape configured to force said source of flowing water out of said channel.

8. A water turbine system comprising:

a floating structure constructed from at least one structural element such that said floating structure comprises a base and a pair of side walls forming a channel, said floating structure configured to be placed within a flowing body of water;

said channel configured to receive a portion of water from said flowing body of water, such that said portion of water flows through said channel from an inlet to an outlet;

a debris shield installed at said inlet of said floating structure, said debris shield placed at an angle relative to said channel such that said debris shield is configured to deflect debris within said flowing body of water away from said channel and into said flowing body of water;

a generator affixed to one of said pair of side walls such that it is placed adjacent to said portion of water through said channel;

a turbine placed within said channel, said comprised of a pickup reel assembly having a plurality of reel connectors, a central shaft, and a drive motor, wherein the drive motor is removed and bats are affixed to each respective one of said plurality of reel connectors, such that said portion of water within said channel pushes against said bats and thereby turns said turbine;

said central shaft comprising at least one end mechanically connected to said generator such that said turbine transfers mechanical energy to said generator and thereby powers said generator; and said generator connected to an external power grid, whereby said generator delivers power to said external power grid.

9. The water turbine system of claim 8, further comprising:

at least one bat being affixed to said central shaft; and whereby said at least one bat contacts said source of flowing water, thereby turning said turbine.

10. The water turbine system of claim 9, wherein said at least one bat is maintained at a vertically up-and-down orientation at all times.

11. The system of claim 9, further comprising:

said channel comprising an exit end whereby said source of flowing water exits said channel; and said exit comprising a flared shape configured to force said source of flowing water out of said channel.

12. A method of generating electrical power from a flowing source of water, the method comprising the steps:

providing a pickup reel assembly comprising a plurality of reel connectors, a central shaft, and a drive motor;

removing said drive motor;

affixing a respective bat to each respective one of said plurality of reel connectors, thereby modifying said pickup reel assembly to function as a turbine;

placing said pickup reel assembly across a channel within the flowing source of water;

connecting an end of said central shaft with a generator located adjacent to said channel;

turning said pickup reel assembly via said flowing source of water pushing against each said respective bat as each said respective bat rotates around and enters into said flowing source of water, wherein each respective bat is positioned such that they enter the flowing source of water in a vertical up-and-down orientation;

thereby transferring mechanical energy from said pickup reel assembly to said generator;

generating the electrical power via said generator;

connecting said generator to an external power grid, such that said generator transmits said electrical power to said external power grid;

providing a debris shield located about an intake end of said channel, said debris shield placed at an angle relative to said channel such that said debris shield deflects debris away from said channel and into said flowing water environment, thereby preventing debris from entering said channel.

13. The method of claim 12, further comprising the steps: providing one or more floating elements configured to form a working barge assembly; placing said working barge assembly within said source of flowing water, thereby forming said channel; and placing said generator on an edge of said working barge assembly.

14. The method of claim 12, wherein said debris shield comprising a V-shape, wherein said V-shape comprises said angle relative to said channel.

* * * * *